US006853839B2

(12) United States Patent
Usuda et al.

(10) Patent No.: US 6,853,839 B2
(45) Date of Patent: Feb. 8, 2005

(54) METHOD OF ANTENNA-WEIGHT ESTIMATION AND MOBILE COMMUNICATION TERMINAL

(75) Inventors: Masafumi Usuda, Kanagawa (JP); Takehiro Nakamura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 633 days.

(21) Appl. No.: 09/863,648

(22) Filed: May 23, 2001

(65) Prior Publication Data

US 2002/0003833 A1 Jan. 10, 2002

(30) Foreign Application Priority Data

May 24, 2000 (JP) ........................................ 2000-153656

(51) Int. Cl.[7] .......................... H04B 1/10; H04B 17/00; H04Q 7/20
(52) U.S. Cl. ............................... 455/276.1; 455/226.3; 455/522; 455/232.1; 455/63.1; 375/148; 375/349; 370/342; 370/318
(58) Field of Search ................................ 455/272, 273, 455/275, 276.1, 277.1, 277.2, 226.2, 226.3, 232.1, 278.1, 63, 65, 522, 127.2, 132–138; 375/147, 148, 149, 349, 346; 370/342, 347, 252, 318; 342/380, 383, 378

(56) References Cited

U.S. PATENT DOCUMENTS 6,087,986 A * 7/2000 Shoki et al. ................ 342/383
6,108,565 A * 8/2000 Scherzer .................. 455/562.1
6,324,160 B1 * 11/2001 Martin et al. ............... 370/209
6,597,678 B1 * 7/2003 Kuwahara et al. .......... 370/342

FOREIGN PATENT DOCUMENTS

GB            2313261 A      11/1997       ............ H04B/7/06

OTHER PUBLICATIONS

3rd Generation Partnership Project, Technical specification Group Radio Access Network; Physical layer procedures 3G TS 2S. 214 1999, pp. 2–40.

Adaptive Beamforming for Spatially Spread Sources Kristine L. Bell & Harry L. Van Trees 1998 IEEE pp. 1–4.

* cited by examiner

Primary Examiner—Duc M. Nguyen
(74) Attorney, Agent, or Firm—Workman Nydegger (57) ABSTRACT

An antenna weight estimation method in a mobile communication system is capable of improving the accuracy of antenna weight estimation values, thereby improving communication quality and increasing radio channel capacity. It operates instantaneous estimation and accumulative estimation in parallel, in which the former is made for estimating the antenna weight used for received SNIR estimation for transmission power control, and the latter is made for demodulating the received data. Thus, it can obtain the antenna weight for the received SNIR measurement with a minimum delay, and at the same time, it can improve the reliability of the antenna weight for the data demodulation.

18 Claims, 5 Drawing Sheets

METHOD OF ANTENNA-WEIGHT ESTIMATION AND MOBILE COMMUNICATION TERMINAL

This application claim priority under 35 U.S.C. 119 to Patent Application No. 2000-153656 filed May 24, 2000 in Japan, the content of which is incorporated hereinto by reference.

BACKGROUND OF THE INVENTION

1. Field of the Invention

The present invention relates to a digital radio communication system, especially to a mobile communication terminal in a mobile communication system, and more particularly to an antenna weight estimation method in a system to which the transmit diversity utilizing a plurality of antennas in a radio base station is applied.

The present invention supposes the system that employs the closed loop mode 1 described in the document 3GPP RAN TS25.214 V3.1.0, December 1999 as the transmit diversity utilizing base station antennas. Although the present invention is applicable to radio access schemes other than CDMA (Code Division Multiple Access), since the foregoing document applies the transmit diversity to a CDMA system, the following description also supposes the CDMA as the radio access scheme.

2. Description of the Related Art

Figure 1:
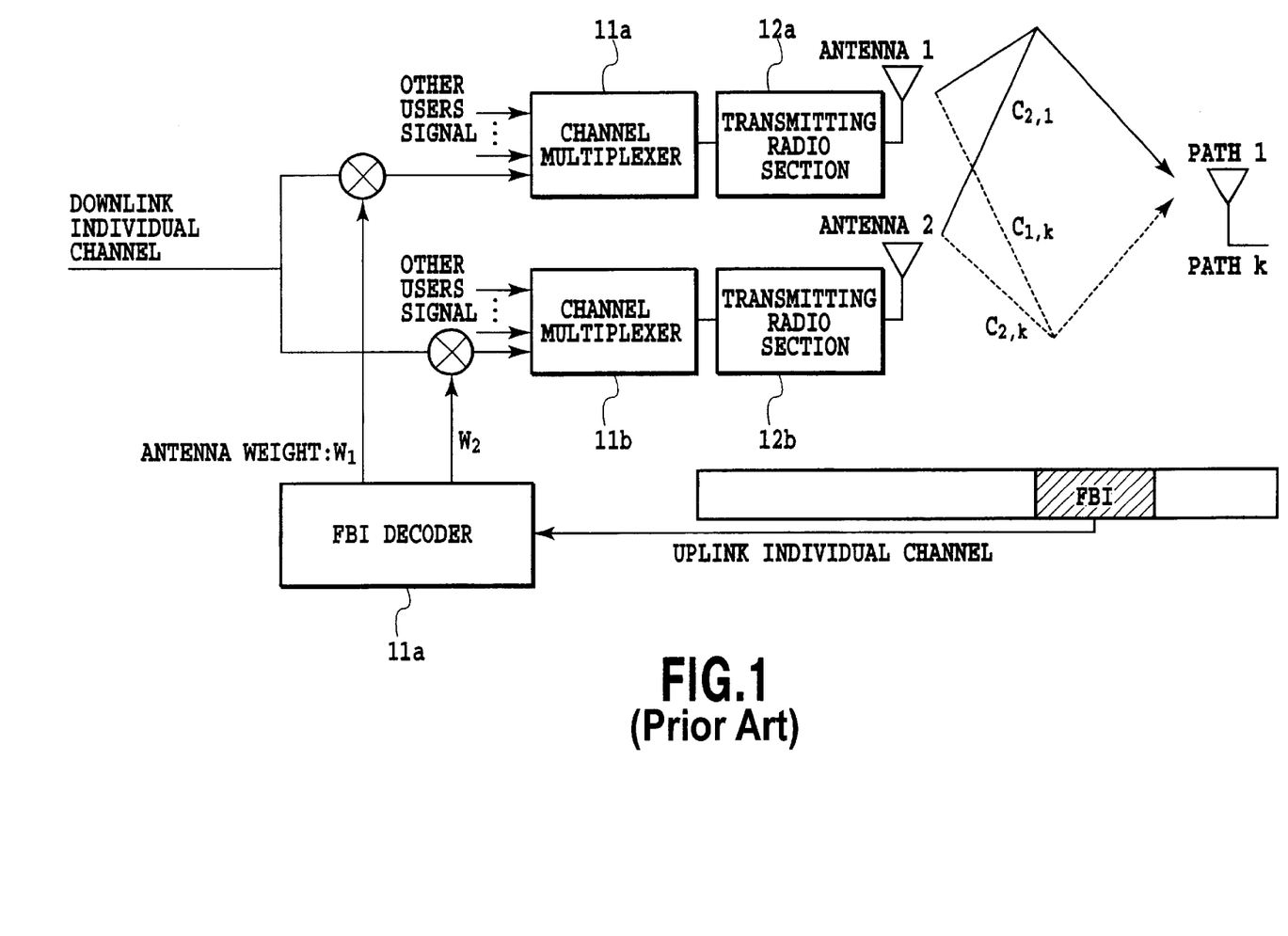
FIG. 1 is a block diagram showing an outline of the transmit diversity using the closed loop mode 1 of a conventional technique.

The transmit diversity based on the closed loop mode 1 is a system using two base station antennas. FIG. 1 shows an outline of the transmit diversity utilizing the closed loop mode 1. A downlink individual channel to which the closed loop mode 1 is applied is multiplied by antenna weights, and then multiplexed with other channels by channel multiplexers 11a and 11b, followed by filtering and frequency conversion by transmitting radio sections 12a and 12b. The antenna weights are controlled by an antenna weight control command, which is mapped onto an uplink individual channel, such that the received signal power increases in a mobile communication terminal. The antenna weight control command is called feedback information (abbreviated to FBI from now on), and a FBI decoder 13 calculates the antenna weights from the FBI mapped onto the uplink individual channel.

It is necessary for the mobile communication terminal to estimate the antenna weights used for the received signals to carry out the Rake combining of the received signals, or to estimate a received SNIR (signal noise interference power ratio). If the base station uses the antenna weights designated by the mobile communication terminal without error, and the mobile communication terminal knows the timing at which the FBI command it designates is reflected in the base station, the mobile communication terminal can decide the antenna weights with believing the FBI command it transmits. Usually, however, the transmitted FBI is not always reflected in the base station correctly because of bit errors in the uplink FBI command. In view of this, the mobile communication terminal estimates the antenna weights using, besides the FBI command, the received signals of individual pilot symbols contained in the individual channels whose quadrature patterns are transmitted from the antennas.

The foregoing document describes an example of the antenna weight estimation method (Simplified Beam Former Verification). This method estimates the transmission antenna weights as follows, where d is an antenna weight control delay in terms of slots, and i is a received slot number in which the uplink FBI bits in the (i-d)th slot are reflected onto the downlink antenna weight.

<When i-d is an Even Number>

The I-component $x_0$ of the antenna weight is estimated by the following algorithm.

If $$2 \sum_{k=0}^{K} \frac{1}{\tilde{\sigma}_k^2} \{2\mathrm{Re}(\tilde{\gamma}\tilde{c}_{d,2,k} \cdot \tilde{c}_{p,2,k}^*)\} > \ln\left(\frac{\bar{p}(\phi_{Rx} = \pi)}{\bar{p}(\phi_{Rx} = 0)}\right) \quad (1)$$

then $$x_0 = 0 \quad (2)$$

else $$x_0 = \pi \quad (3)$$

<When i-d is an Odd Number>

The Q-component $x_1$ of the antenna weight is estimated by the following algorithm.

If $$-2 \sum_{k=0}^{K} \frac{1}{\tilde{\sigma}_k^2} \{2\mathrm{Im}(\tilde{\gamma}\tilde{c}_{d,2,k} \cdot \tilde{c}_{p,2,k}^*)\} > \ln\left(\frac{\bar{p}(\phi_{Rx} = -\frac{\pi}{2})}{\bar{p}(\phi_{Rx} = \frac{\pi}{2})}\right) \quad (4)$$

then $$x_1 = -\frac{\pi}{2} \quad (5)$$

else $$x_1 = \frac{\pi}{2} \quad (6)$$

where $\tilde{c}_{p,2,k}(n)$ is a channel estimation value of the kth finger of the antenna 2 obtained by using a common pilot channel, $\tilde{c}_{d,2,k}(n)$ is a channel estimation value (including the antenna weight) of the kth finger of the antenna 2 obtained by using an individual pilot channel, $\sigma_k^2$ is an estimation value of the noise interference power of the kth finger, $\gamma^2$ is an estimation value of the ratio between the received power of the individual pilot symbol and the received signal power of the common pilot channel, and $\bar{p}(\phi_{Rx}=x)$ is the prior probability that the phase difference becomes x, where the phase difference is that between the I-component or Q-component of the antenna weight obtained from the FBI bit the mobile communication terminal itself transmit and the estimated error rate of the FBI bit. The $X_0$ and $X_1$ keep their value until updated, and the antenna weight estimation value $\tilde{w}$ is given by $$\tilde{w} = \frac{\sum_{i=0}^{1} \cos(x_i)}{\sqrt{2}} + j \frac{\sum_{i=0}^{1} \sin(x_i)}{\sqrt{2}} \quad (7)$$

This method does not estimate one of the foregoing four states ($\pi/4$, $3\pi/4$, $-3\pi/4$, $-\pi/4$) the antenna weight can take from the individual pilots received by the antenna 2 in each slot, but estimates, as to the FBI the base station receives in each slot, the phase difference that is updated in each slot by using the FBI the mobile communication terminal itself transmits and the individual pilots received by the antenna 2.

Figure 2:
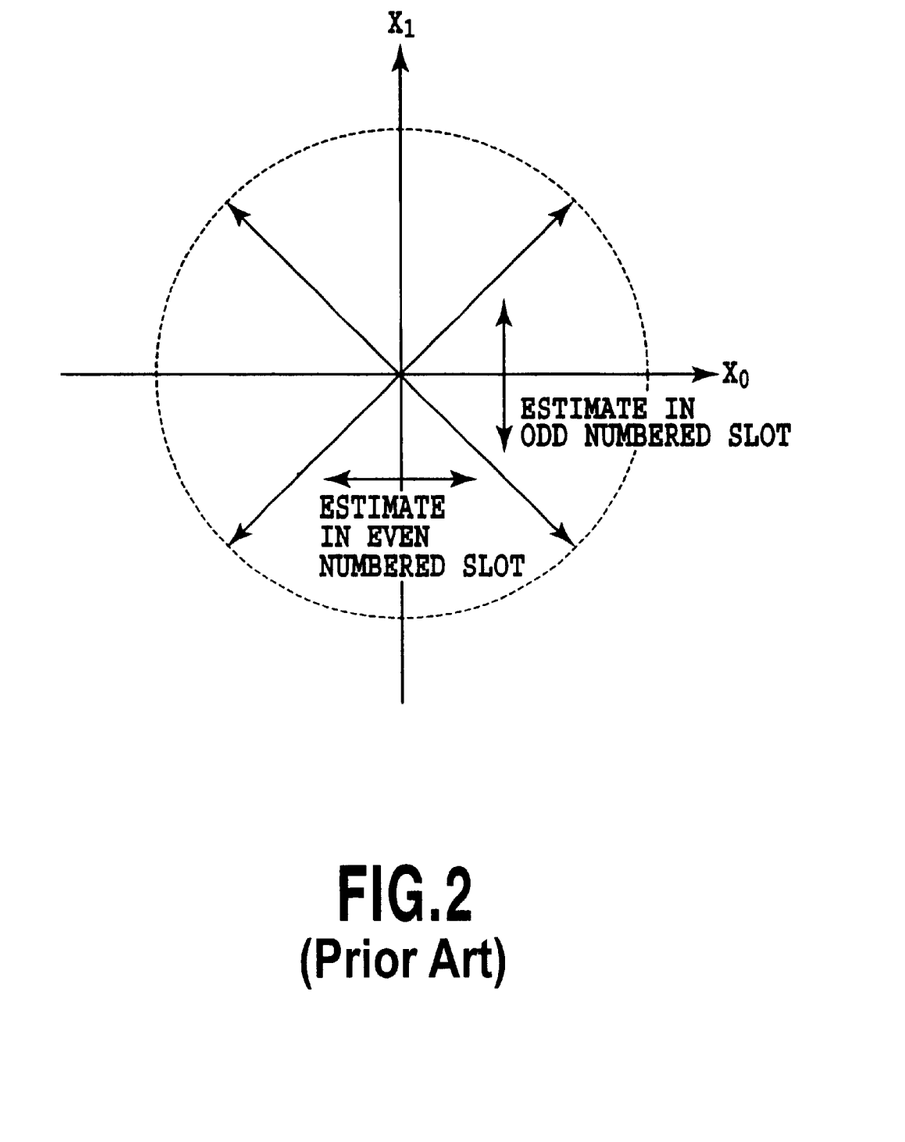
FIG. 2 is a schematic diagram illustrating the values the phase difference of the antenna weight can take and the estimation timings in the conventional technique.

FIG. 2 illustrates values and estimation timings the phase difference of the antenna weight can take. It is shown from FIG. 2 that the I-components of the weight are estimated in the received slots #0+d, 2+d, 4+d, 6+d, 8+d, 10+d, 12+d and 14+d, and the Q-components are estimated in the remaining received slots.

Since the conventional antenna weight estimation method described above estimates only the timings of change of the phase difference by the FBI, it cannot carry out the estimation by making full use of the received power of the individual pilots fed from the antenna 2. More specifically, although the I-components of the antenna weight selected in even numbered slot are used until the next odd numbered slot arrives and the Q-components of the antenna weight selected in the odd numbered slot are used until the next even numbered slot arrives, the conventional method, which estimates the weight only immediately after the components are changed, does not use the received signals of the individual pilots received by the antenna 2 in the following slots.

To make better use of the received signals of the individual pilot symbols for estimating the antenna weight, a method is effective that estimates the I-components of the weight using, after receiving an odd numbered slot, the individual pilots in both the previous even numbered slot and in the odd numbered slot, and estimates the Q-components of the weight using, after receiving an even numbered slot, the individual pilots in both the previous odd numbered slot and in the even numbered slot. However, as for the antenna weight used for estimating the received SNIR for the transmission power control, it must be estimated instantaneously at the timings when the individual pilots are received.

SUMMARY OF THE INVENTION

In view of this, an object of the present invention is to improve the communication quality and increase the radio channel capacity by obtaining the antenna weights used for the received SNIR estimation with a minimum delay, and the antenna weights for demodulating data with higher reliability by operating the instantaneous estimation for estimating the antenna weights used for the received SNIR estimation for the transmission power control in parallel with the accumulative estimation for demodulating the received data.

As for the conventional method, although it estimates the antenna weights using both the posterior probabilities and prior probabilities, it does not calculate the logarithmic likelihood of the posterior probabilities accurately. In contrast, the present invention improves the accuracy of the antenna weight estimation values by calculating the amplitude of individual pilot symbols and noise interference power after Rake combining, and by making the antenna weight estimation by obtaining the logarithmic likelihood using the calculated values, thereby implementing the object of improving the communication quality and increasing the radio channel capacity.

To accomplish the objects of the present invention, according to a first aspect of the present invention, there is provided a mobile communication terminal in a mobile communication system including the mobile communication terminal and a radio base station carrying out transmission using a plurality of antennas, the mobile communication terminal comprising: antenna weight instantaneous estimation means for estimating an instantaneous estimation value of an antenna weight from a signal received at a moment of estimation; antenna weight accumulative estimation means for estimating an accumulative estimation value of the antenna weight from accumulated received signals; received SNIR calculation means for calculating a received SNIR from the instantaneous estimation value obtained by the antenna weight instantaneous estimation means; transmission power control command generator for generating a transmission power control command from the received SNIR calculated by the received SNIR calculation means; and Rake combining means for carrying out Rake combining of the received signals in response to the accumulative estimation value obtained by the antenna weight accumulative estimation means.

This configuration can improve the communication quality and increase the radio channel capacity by reducing degradation in the received signals due to the antenna weight estimation error by making not only the antenna weight instantaneous estimation used for the received SNIR measurement, but also the antenna weight accumulative estimation, and by using the antenna weights estimated by the antenna weight accumulative estimator for the received data demodulation.

According to a second aspect of the present invention, there is provided a mobile communication terminal in a mobile communication system including the mobile communication terminal and a radio base station carrying out transmission using a plurality of antennas, the mobile communication terminal comprising: received signal amplitude estimation means for estimating average received signal amplitude after Rake combining; noise interference power calculation means for calculating noise interference power after Rake combining; antenna weight posterior probability calculation means for obtaining posterior probabilities of the antenna weight from the received signal amplitude estimation value obtained by the received signal amplitude estimation means, and from the noise interference power calculation value obtained by the noise interference power calculation means; antenna weight prior probability calculation means for obtaining prior probabilities of the antenna weight in response to an antenna weight control command transmitted from the mobile communication terminal; and antenna weight estimation means for estimating the antenna weight from the posterior probabilities obtained by the antenna weight posterior probability calculation means and from the prior probabilities obtained by the antenna weight prior probability calculation means.

This configuration can reduce the antenna weight estimation error, and hence improve the communication quality and increase the radio channel capacity by making the highly accurate antenna weight estimation by obtaining the posterior probabilities using the amplitude of the individual pilot symbols and noise interference power after the Rake combining.

Here, the antenna weight instantaneous estimation means may comprise: received signal amplitude estimation means for estimating average received signal amplitude after Rake combining; noise interference power calculation means for calculating noise interference power after Rake combining; antenna weight posterior probability calculation means for obtaining posterior probabilities of the antenna weight from the received signal amplitude estimation values obtained by the received signal amplitude estimation means, and from the noise interference power calculation values obtained by the noise interference power calculation means; antenna weight prior probability calculation means for obtaining prior probabilities of the antenna weight in response to an antenna weight control command transmitted from the mobile communication terminal; and antenna weight estimation means for estimating the antenna weight from the posterior probabilities obtained by the antenna weight posterior probability calculation means and from the prior probabilities obtained by the antenna weight prior probability calculation means.

This configuration can reduce the antenna weight estimation error, and hence improve the communication quality and increase the radio channel capacity by making the highly accurate antenna weight estimation by obtaining the posterior probabilities using the amplitude of the individual pilot symbols and noise interference power after the Rake combining.

The antenna weight accumulative estimation means may comprise: received signal amplitude estimation means for estimating average received signal amplitude after Rake combining; noise interference power calculation means for calculating noise interference power after Rake combining; antenna weight posterior probability calculation means for obtaining posterior probabilities of the antenna weight from the received signal amplitude estimation values obtained by the received signal amplitude estimation means, and from the noise interference power calculation values obtained by the noise interference power calculation means; antenna weight prior probability calculation means for obtaining prior probabilities of the antenna weight in response to an antenna weight control command transmitted from the mobile communication terminal; and antenna weight estimation means for estimating the antenna weight from the posterior probabilities obtained by the antenna weight posterior probability calculation means and from the prior probabilities obtained by the antenna weight prior probability calculation means.

This configuration can reduce the antenna weight estimation error, and hence improve the communication quality and increase the radio channel capacity by making the highly accurate antenna weight estimation by obtaining the posterior probabilities using the amplitude of the individual pilot symbols and noise interference power after the Rake combining.

The received signal amplitude estimation means may include I-component amplitude estimation means and Q-component amplitude estimation means, the I-component amplitude estimation means calculating amplitude of I-components of the received signals from channel estimation values including the antenna weight obtained from individual pilot channels received at individual fingers and channel estimation values obtained from a common pilot channel, and the Q-component amplitude estimation means calculating amplitude of Q-components of the received signals from channel estimation values including the antenna weight obtained from individual pilot channels received at individual fingers and channel estimation values obtained from a common pilot channel; the noise interference power calculation means may include means for calculating noise interference power calculation values from calculation values of noise interference power included in the fingers; and the antenna weight posterior probability calculation means may include antenna weight I-component posterior probability calculation means and antenna weight Q-component posterior probability calculation means, the antenna weight I-component posterior probability calculation means calculating the posterior probabilities of the antenna weight I-components from the I-component amplitude estimation values obtained by the I-component amplitude estimation means and the noise interference power calculation values obtained by the noise interference power calculation means, and the antenna weight Q-component posterior probability calculation means calculating the posterior probabilities of the antenna weight Q-components from the Q-component amplitude estimation values obtained by the Q-component amplitude estimation means and the noise interference power calculation values obtained by the noise interference power calculation means.

This configuration can reduce the antenna weight estimation error, and hence improve the communication quality and increase the radio channel capacity by making the highly accurate antenna weight estimation by obtaining the posterior probabilities using the amplitude of the individual pilot symbols and noise interference power after the Rake combining.

According to a third aspect of the present invention, there is provided an antenna weight estimation method in a mobile communication system including a mobile communication terminal and a radio base station carrying out transmission using a plurality of antennas, the antenna weight estimation method comprising: an antenna weight instantaneous estimation step of estimating an instantaneous estimation value of an antenna weight from a signal received at a moment of estimation; an antenna weight accumulative estimation step of estimating an accumulative estimation value of the antenna weight from accumulated received signals; a received SNIR calculation step of calculating a received SNIR from the instantaneous estimation value obtained by the antenna weight instantaneous estimation step; a transmission power control command generating step of generating a transmission power control command from the received SNIR calculated by the received SNIR calculation step; and a Rake combining step of carrying out Rake combining of the received signals in response to the accumulative estimation value obtained by the antenna weight accumulative estimation step.

This method can improve the communication quality and increase the radio channel capacity by reducing degradation in the received signals due to the antenna weight estimation error by making not only the antenna weight instantaneous estimation used for the received SNIR measurement, but also the antenna weight accumulative estimation, and by using the antenna weight estimated by the antenna weight accumulative estimator for the received data demodulation.

According to a fourth aspect of the present invention, there is provided an antenna weight estimation method in a mobile communication system including a mobile communication terminal and a radio base station carrying out transmission using a plurality of antennas, the antenna weight estimation method comprising: a received signal amplitude estimation step of estimating average received signal amplitude after Rake combining; a noise interference power calculation step of calculating noise interference power after Rake combining; an antenna weight posterior probability calculation step of obtaining posterior probabilities of the antenna weight from the received signal amplitude estimation value obtained by the received signal amplitude estimation step, and from the noise interference power calculation value obtained by the noise interference power calculation step; an antenna weight prior probability calculation step of obtaining prior probabilities of the antenna weight in response to an antenna weight control command transmitted from the mobile communication terminal; and an antenna weight estimation step of estimating the antenna weight from the posterior probabilities obtained by the antenna weight posterior probability calculation step and from the prior probabilities obtained by the antenna weight prior probability calculation step.

This method can reduce the antenna weight estimation error, and hence improve the communication quality and increase the radio channel capacity by making the highly accurate antenna weight estimation by obtaining the posterior probabilities using the amplitude of the individual pilot symbols and noise interference power after the Rake combining.

Here, the antenna weight instantaneous estimation step may comprises: a received signal amplitude estimation step of estimating average received signal amplitude after Rake combining; a noise interference power calculation step of calculating noise interference power after Rake combining; an antenna weight posterior probability calculation step of obtaining posterior probabilities of the antenna weight from the received signal amplitude estimation values obtained by the received signal amplitude estimation step, and from the noise interference power calculation values obtained by the noise interference power calculation step; an antenna weight prior probability calculation step of obtaining prior probabilities of the antenna weight in response to an antenna weight control command transmitted from the mobile communication terminal; and an antenna weight estimation step of estimating the antenna weight from the posterior probabilities obtained by the antenna weight posterior probability calculation step and from the prior probabilities obtained by the antenna weight prior probability calculation step.

This method can reduce the antenna weight estimation error, and hence improve the communication quality and increase the radio channel capacity by making the highly accurate antenna weight estimation by obtaining the posterior probabilities using the amplitude of the individual pilot symbols and noise interference power after the Rake combining.

The antenna weight accumulative estimation step may comprise: a received signal amplitude estimation step of estimating average received signal amplitude after Rake combining; a noise interference power calculation step of calculating noise interference power after Rake combining; an antenna weight posterior probability calculation step of obtaining posterior probabilities of the antenna weight from the received signal amplitude estimation values obtained by the received signal amplitude estimation step, and from the noise interference power calculation values obtained by the noise interference power calculation step; an antenna weight prior probability calculation step of obtaining prior probabilities of the antenna weight in response to an antenna weight control command transmitted from the mobile communication terminal; and an antenna weight estimation step of estimating the antenna weight from the posterior probabilities obtained by the antenna weight posterior probability calculation step and from the prior probabilities obtained by the antenna weight prior probability calculation step.

This method can reduce the antenna weight estimation error, and hence improve the communication quality and increase the radio channel capacity by making the highly accurate antenna weight estimation by obtaining the posterior probabilities using the amplitude of the individual pilot symbols and noise interference power after the Rake combining.

The received signal amplitude estimation step may include an I-component amplitude estimation step and a Q-component amplitude estimation step, the I-component amplitude estimation step calculating amplitude of I-components of the received signals from channel estimation values including the antenna weight obtained from individual pilot channels received at individual fingers and channel estimation values obtained from a common pilot channel, and the Q-component amplitude estimation step calculating amplitude of Q-components of the received signals from channel estimation values including the antenna weight obtained from individual pilot channels received at individual fingers and channel estimation values obtained from a common pilot channel; the noise interference power calculation step may include a step of calculating noise interference power calculation values from calculation values of noise interference power included in the fingers; and the antenna weight posterior probability calculation step may include an antenna weight I-component posterior probability calculation step and an antenna weight Q-component posterior probability calculation step, the antenna weight I-component posterior probability calculation step calculating the posterior probabilities of the antenna weight I-components from the I-component amplitude estimation values obtained by the I-component amplitude estimation step and the noise interference power calculation values obtained by the noise interference power calculation step, and the antenna weight Q-component posterior probability calculation step calculating the posterior probabilities of the antenna weight Q-components from the Q-component amplitude estimation values obtained by the Q-component amplitude estimation step and the noise interference power calculation values obtained by the noise interference power calculation step.

This method can reduce the antenna weight estimation error, and hence improve the communication quality and increase the radio channel capacity by making the highly accurate antenna weight estimation obtaining the posterior probabilities using the amplitude of the individual pilot symbols and noise interference power after the Rake combining.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The preferred embodiment in accordance with the present invention will now be described in reference to the accompanying drawings.

Figure 3:
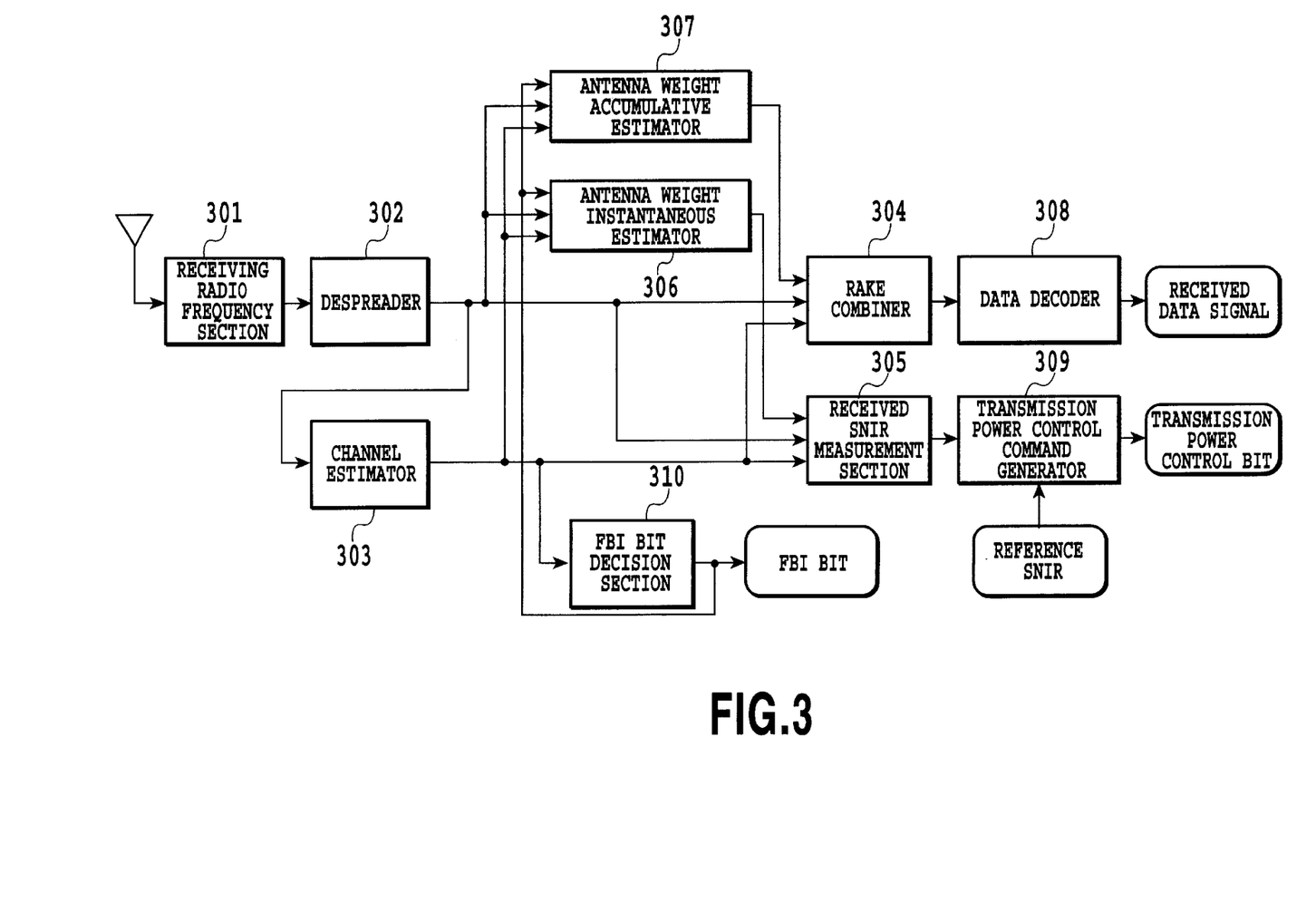
FIG. 3 is a block diagram showing a configuration of the receiver in a CDMA mobile station of an embodiment 1 in accordance with the present invention.

FIG. 3 shows an example of the receiver in a CDMA mobile station of an embodiment in accordance with the present invention. The receiver of the CDMA mobile station comprises a receiving radio frequency section 301, a despreader 302, a channel estimator 303, a Rake combiner 304, a received SNIR measurement section 305, an antenna weight instantaneous estimator 306, an antenna weight accumulative estimator 307, a data decoder 308, a transmission power control command generator 309, and an FBI bit decision section 310.

In this configuration, the receiving radio frequency section 301 receives a radio signal transmitted from a radio base station, followed by frequency conversion and filtering, and outputs a baseband signal. The despreader 302 despreads the baseband signal and supplies the despread signal to the channel estimator 303, Rake combiner 304 and received SNIR measuring section 305. The channel estimator 303 makes the channel estimation using the individual pilot symbols and the despread signal of the common pilot channel, and supplies the channel estimation values to the antenna weight instantaneous estimator 306, antenna weight accumulative estimator 307, Rake combiner 304 and received SNIR measurement section 305. The channel estimation values supplied from the channel estimator 303 to these sections can be an average value taken over different time sections depending on the delay requirement of the sections.

The antenna weight instantaneous estimator 306 calculates posterior probabilities using the channel estimation values of the received signals sent from the antenna 2, which are obtained from the individual pilot and common pilot channels, and calculates the prior probabilities using the FBI bits the mobile station transmits via the uplink channel. It successively estimates the antenna weights slot by slot using the posterior probabilities in combination with the prior probabilities, and supplies the estimation results to the received SNIR estimator 305. The received SNIR measurement section 305 calculates the received SNIR values using the antenna weight estimation values fed from the antenna weight instantaneous estimator 306, the channel estimation values fed from the channel estimator 303 and the individual pilot or common pilot channel fed from the despreader 302. The SNIR values are compared with the reference SNIR by the transmission power control command generator 309 so that it generates from the compared results the transmission power control bits to be transmitted through the uplink channel.

The antenna weight accumulative estimator 307 accumulates the channel estimation values of the individual pilot and common pilot channels over an update period (two slots) of the I-components and Q-components of the antenna weights. Subsequently, it calculates the posterior probabilities by combining the accumulated channel estimation values over the two slots, and calculates the prior probabilities using the FBI bits the mobile station transmits through the uplink channel. It estimates the antenna weight from the posterior probabilities and prior probabilities, and supplies the estimation results to the Rake combiner 304.

The Rake combiner 304 carries out the Rake combining using the channel estimation values fed from the channel estimator 303, the received signals of the individual channels fed from the despreader 304 and the antenna weight estimation values fed from the antenna weight accumulative estimator 307, and supplies its results to the data decoder 308. The data decoder 308 carries out deinterleaving and FEC decoding, thereby obtaining the received data signal.

The transmission power control command generator 309 compares the output from the received SNIR measurement section 305 with the predetermined reference SNIR to calculate the value of the transmission power control bits.

The FBI bit decision section 310 selects the antenna weights to be used by the base station on the basis of the channel estimation fed from the channel estimator 303, and outputs the corresponding FBI bits.

Figure 4:
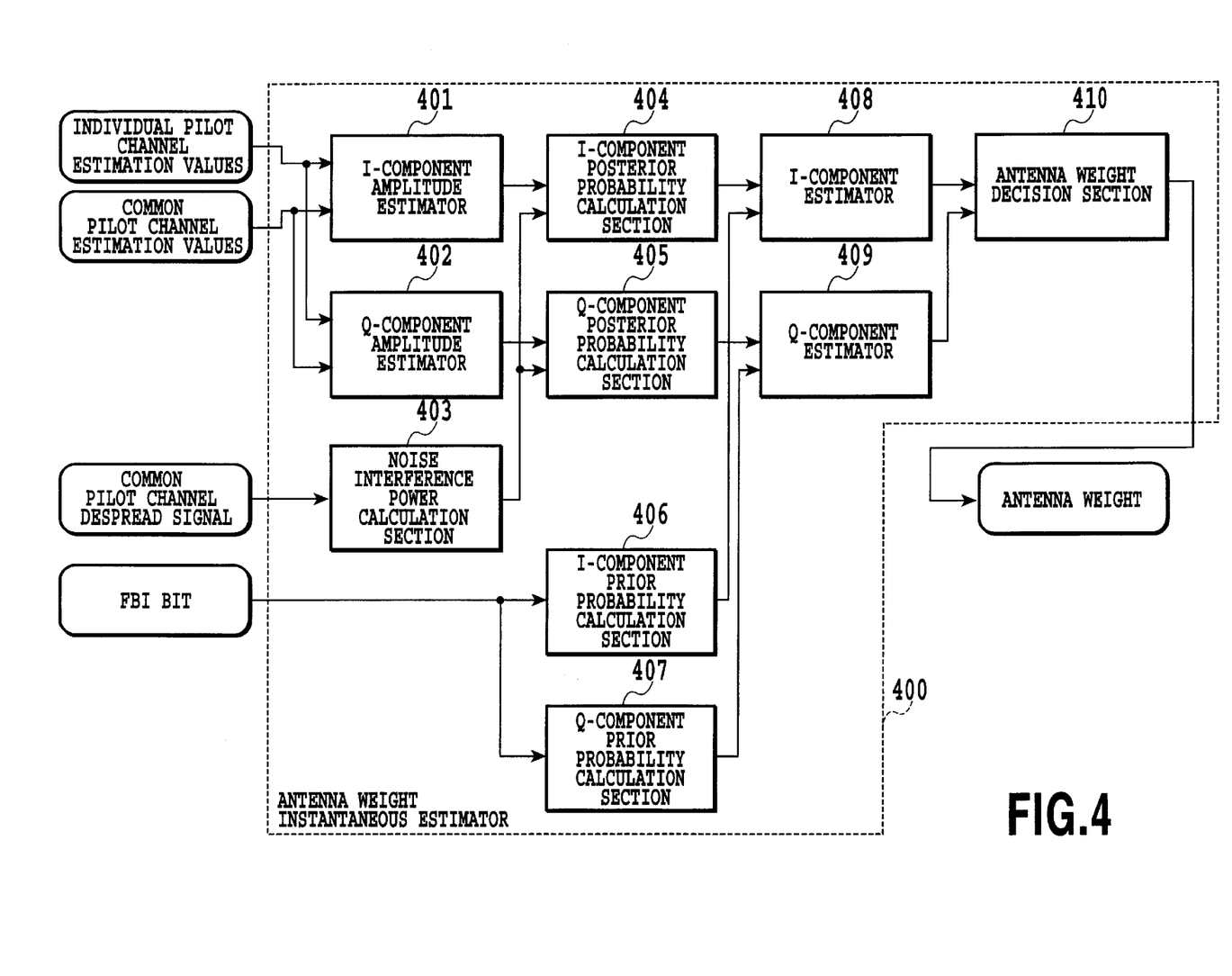
FIG. 4 is a block diagram showing a configuration of an antenna weight instantaneous estimator in accordance with the present invention.

FIG. 4 shows an example of the antenna weight instantaneous estimator in accordance with the present invention. The antenna weight instantaneous estimator 400 comprises an I-component amplitude estimator 401, a Q-component amplitude estimator 402, a noise interference power calculation section 403, an I-component posterior probability calculation section 404, a Q-component posterior probability calculation section 405, an I-component prior probability calculation section 406, a Q-component prior probability calculation section 407, an I-component estimator 408, a Q-component estimator 409 and an antenna weight decision section 410.

In this configuration, the I-component amplitude estimator 401 estimates the amplitude of the I-components of the individual pilot symbols using the channel estimation values obtained from the individual pilot symbols and the common pilot channel, and the Q-component amplitude estimator 402 estimates the amplitude of the Q-components. Assuming that a #i slot is received and that a delay of d slots takes place when reflecting the FBI bits of the uplink channel onto the downlink antenna weights, the estimation of the I-component and Q-component is made by the following algorithm.

<When i-d is an Even Number>

$$Amp_0 = \sum_{k=1}^{K} \{\text{Re}[\tilde{c}_{d,2,k}(i) \cdot \tilde{c}_{p,2,k}^{*}(i)]\} \quad (8)$$

<When i-d is an Odd Number>

$$Amp_1 = \sum_{k=1}^{K} \{\text{Im}[\tilde{c}_{d,2,k}(i) \cdot \tilde{c}_{p,2,k}^{*}(i)]\} \quad (9)$$

where $\tilde{c}_{d,2,k}(i)$ is the channel estimation value of the ith slot (including the antenna weight) of the kth finger of the individual pilot transmitted from the antenna 2, and $\tilde{c}_{p,2,k}(k)$ is the channel estimation value at the ith slot of the common pilot channel transmitted from the antenna 2. As for the $Amp_0$ and $Amp_1$, they keep their value until they are updated.

The noise interference power calculation section 403 calculates the I-component or Q-component of the noise interference power after the Rake combining, and outputs it. Assuming that the output noise interference power is $Sigma^2$, it is calculated as follows, for example (usually since the noise interference power is the same for the I-component and Q-component, multiplying ½ brings about it).

$$Sigma^2 = \frac{1}{2}\sum_{k=1}^{K} |\tilde{c}_{p,2,k}|^2 \tilde{\sigma}_k^2 \quad (10)$$

As for the estimation value $\sigma_k^2$ of the noise interference power of the kth finger, it can be calculated from the common pilot channel and the like by the noise interference power calculation section 403, or it can be supplied as the result of the calculation by the received SNIR measurement section 305, either of which can be employed in the present embodiment.

The I-component posterior probability calculation section 404 and the Q-component posterior probability calculation section 405 calculate the posterior probabilities as a likelihood ratio as follows from the amplitude estimation values (Amp$_0$ and Amp$_1$) of the respective components supplied from the I-component amplitude estimator 401 and Q-component amplitude estimator 402, and from the noise interference power estimation value Sigma$^2$ supplied from the noise interference power calculation section 403.

<Calculation by the I-component Posterior Probability Calculation Section>

$$metric_{post,i} = \ln\left(\frac{\hat{p}(\phi_{Rx} = \pi)}{\hat{p}(\phi_{Rx} = 0)}\right) = \frac{2Amp_0 \cdot Ave(|Amp_0|)}{Sigma^2} \quad (11)$$

<Calculation by the Q-component Posterior Probability Calculation Section>

$$metric_{post,q} = \ln\left(\frac{\hat{p}\left(\phi_{Rx} = \frac{\pi}{2}\right)}{\hat{p}\left(\phi_{Rx} = -\frac{\pi}{2}\right)}\right) = \frac{2Amp_1 \cdot Ave(|Amp_1|)}{Sigma^2} \quad (12)$$

where $metric_{post,i}$ is the likelihood ratio of the I-component, $metric_{post,q}$ is the likelihood ratio of the Q-component, and $\hat{p}(\phi_{Rx}=X)$ is the posterior probability that the phase difference of the I-component or Q-component of the antenna weight, which is obtained from the individual pilot symbols transmitted from the antenna 2 and received by the mobile communication terminal, becomes x. As for the function Ave( ) representing averaging, it is applicable to the case where the averaging is made over a plurality of slots, or to the case where no averaging is made substantially, either of which can be employed by the present embodiment.

The I-component prior probability calculation section 406 and the Q-component prior probability calculation section 407 calculate the prior probabilities of the I and Q components as the likelihood ratio using the uplink FBI bit.

<When i-d is an Even Number>

$$metric_{pri,i} = \ln\left(\frac{\overline{p}(\phi_{Rx} = 0)}{\overline{p}(\phi_{Rx} = \pi)}\right) = \{1 - 2 \times FBIbit(i-d)\} \times \quad (13)$$

$$\ln\left(\frac{1 - Err\_rate}{Err\_rate}\right)$$

<When i-d is an Odd Number>

$$metric_{pri,q} = \ln\left(\frac{\overline{p}\left(\phi_{Rx} = \frac{\pi}{2}\right)}{\overline{p}\left(\phi_{Rx} = -\frac{\pi}{2}\right)}\right) = \{1 - 2 \times FBIbit(i-d)\} \times \quad (14)$$

$$\ln\left(\frac{1 - Err\_rate}{Err\_rate}\right)$$

where $metric_{post,i}$ is the I-component likelihood ratio, $metric_{post,q}$ is the Q-component likelihood ratio, and FBIbit (a) is a function that represents the FBI bit transmitted by the #a slot on the uplink channel, and that outputs zero when the mobile communication terminal selects 0 ($\pi/2$) as the I component (Q component), and outputs one when it selects $\pi(-\pi/2)$ as the I component (Q component). Err_rate represents the error rate of the uplink FBI bit the mobile communication terminal estimates.

The antenna weight I-component estimator 408 and the antenna weight Q-component estimator 409 determine the I-component and the Q-component of the antenna weight estimation values, respectively, by the following algorithm using the prior probabilities and posterior probabilities.

<Calculation by the I-component Estimator>

If $$metric_{pri,i} + metric_{post,i} > 0 \quad (15)$$

Then $$X_0 = 0 \quad (16)$$

Else $$X_0 = 0 \quad (17)$$

<Calculation by the Q-component Estimator>

If $$metric_{pri,q} + metric_{post,q} > 0 \quad (18)$$

Then $$X_1 = \pi/2 \quad (19)$$

Else $$X_1 = -\pi/2 \quad (20)$$

The antenna weight decision section 410, using the $X_0$ and $X_1$ output from the I-component estimator 408 and the Q-component estimator 409, finally outputs the antenna weight w satisfying the following expression.

$$\tilde{w} = \frac{\sum_{i=0}^{1} \cos(x_i)}{\sqrt{2}} + j\sum_{i=0}^{1} \frac{\sin(x_i)}{\sqrt{2}} \quad (21)$$

Figure 5:
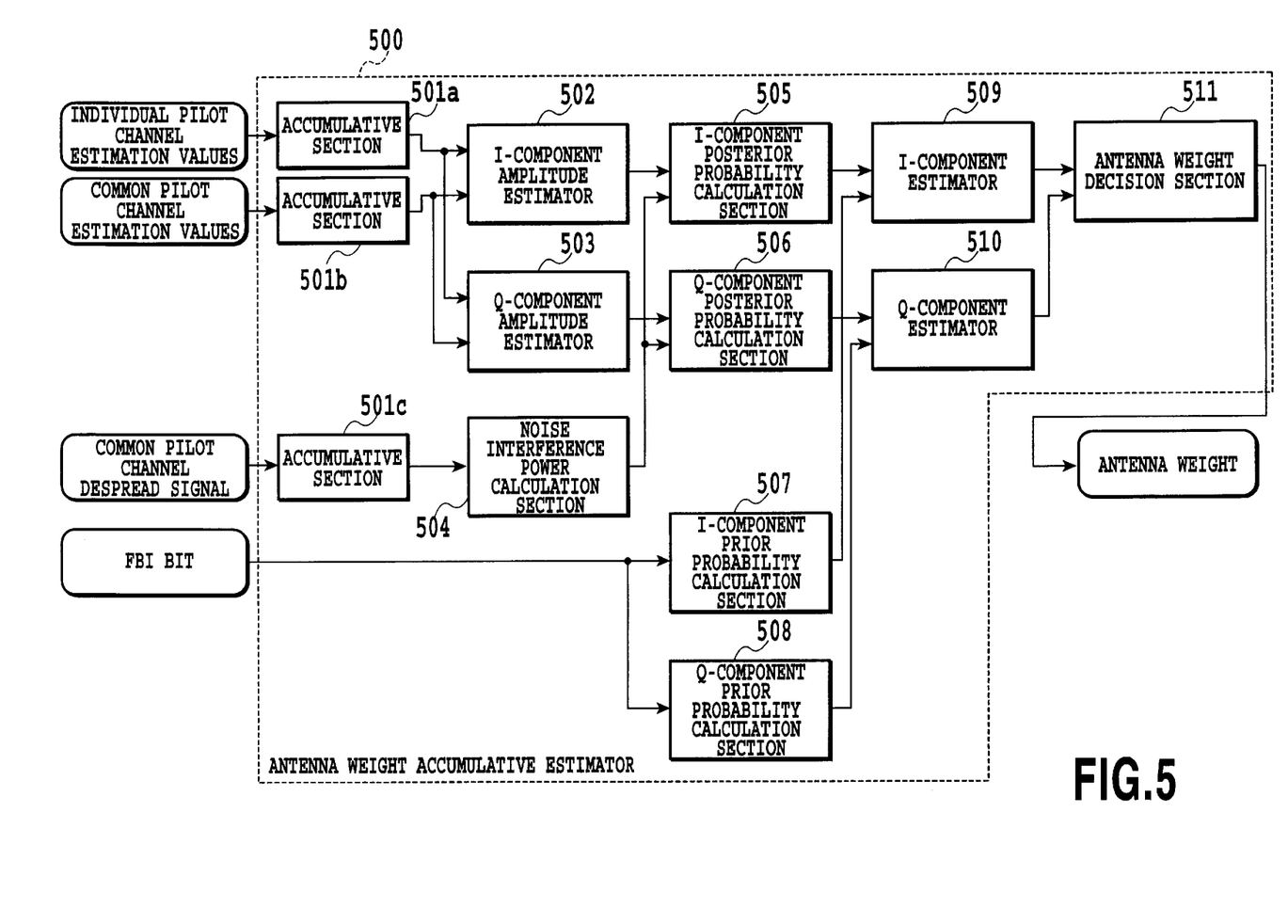
FIG. 5 is a block diagram showing a configuration of an antenna weight accumulative estimator in accordance with the present invention.

FIG. 5 shows an example of the antenna weight accumulative estimator in accordance with the present invention. The antenna weight accumulative estimator 500 comprises accumulative sections 501a–501c, an I-component amplitude estimator 502, a Q-component amplitude estimator 503, a noise interference power calculation section 504, an I-component posterior probability calculation section 505, a Q-component posterior probability calculation section 506, an I-component prior probability calculation section 507, a Q-component prior probability calculation section 508, an I-component estimator 509, a Q-component estimator 510, and an antenna weight decision section 511.

In this configuration, the accumulative sections 501a and 501b each accumulate the channel estimation values over one slot interval. On the other hand, the accumulative section 501c accumulates the common pilot received despread signal over one slot interval to always enable the antenna weight estimation using received data of two slots. The I-component amplitude estimator 502 estimates the amplitude of the I-component of the individual pilot symbols using the channel estimation values obtained from the individual pilot symbols and the common pilot channel in the same manner as the I-component amplitude estimator 401 in the antenna weight instantaneous estimator. Likewise, the Q-component amplitude estimator 503 estimates the amplitude of the Q-component in the same manner as the Q-component amplitude estimator 402. Assuming that the antenna weight of the #i slot is estimated, and that d-slot delay occurs when reflecting the FBI bits of the uplink channel onto the antenna weight of the downlink, the I-component and Q-component of the antenna weight of the #i slot can be estimated by the following algorithm, for example.

<When i-d is an Even Number (2n where n is an Integer)>

$$Amp_0 = \sum_{k=1}^{K} \left\{ \frac{1}{2} \times \text{Re}[\tilde{c}_{d,2,k}(2n) \cdot \tilde{c}^*_{p,2,k}(2n) + \tilde{c}_{d,2,k}(2n+1) \cdot \tilde{c}^*_{p,2,k}(2n+1)] \right\} \quad (22)$$

$$Amp_1 = \sum_{k=1}^{K} \left\{ \frac{1}{2} \times \text{Im}[\tilde{c}_{d,2,k}(2n-1) \cdot \tilde{c}^*_{p,2,k}(2n-1) + \tilde{c}_{d,2,k}(2n) \cdot \tilde{c}^*_{p,2,k}(2n)] \right\} \quad (23)$$

<When i-d is an Odd Number (2n+1 where n is an Integer)>

$$Amp_0 = \sum_{k=1}^{K} \left\{ \frac{1}{2} \times \text{Re}[\tilde{c}_{d,2,k}(2n) \cdot \tilde{c}^*_{p,2,k}(2n) + \tilde{c}_{d,2,k}(2n+1) \cdot \tilde{c}^*_{p,2,k}(2n+1)] \right\} \quad (24)$$

$$Amp_1 = \sum_{k=1}^{K} \left\{ \frac{1}{2} \times \text{Im}[\tilde{c}_{d,2,k}(2n+1) \cdot \tilde{c}^*_{p,2,k}(2n+1) + \tilde{c}_{d,2,k}(2n+2) \cdot \tilde{c}^*_{p,2,k}(2n+2)] \right\} \quad (25)$$

Here, as for the suffix m of the $\tilde{c}_{d,2,k}(m)$ または $\tilde{c}_{p,2,k}(m)$ in equations (22)–(25), which indicates the slot number, when it does not satisfy the condition $0 \leq m \leq 14$, it is brought into correspondence with the slot number by adding or subtracting seven to or from the integer n.

The I-component posterior probability calculation section 505, Q-component posterior probability calculation section 506, I-component prior probability calculation section 507, Q-component prior probability calculation section 508, I-component estimator 509, Q-component estimator 510, and antenna weight decision section 511 operate in the same manner as their counterparts in the antenna weight instantaneous estimator, thereby outputting the antenna weight estimation values.

As described above, the present embodiment comprises not only the antenna weight instantaneous estimator that estimates the antenna weight used for measuring the received SNIR with a minimum delay, but also the antenna weight accumulative estimator that estimates the antenna weight after accumulating the received signals over two slots intervals in which the I-components and Q-components of the weight are successively used in the base station, so that the antenna weights estimated by the antenna weight accumulative estimator are used for the received data demodulation, thereby reducing the degradation in the received signals due to the antenna weight estimation error.

Furthermore, the present embodiment can implement highly accurate antenna weight estimation by obtaining the posterior probabilities using the amplitude of the individual pilot symbols and noise interference power after the Rake combining in the antenna weight estimation using the individual pilot symbols.

The present invention has been described in detail with respect to preferred embodiments, and it will now be apparent from the foregoing to those skilled in the a rt that changes and modifications may be made without d eparting from the invention in its broader aspects, and it is the intention, therefore, in the appended claims to cover all such changes and modifications as fall wit hin the true spirit of the invention.

What is claimed is:

1. A mobile communication terminal in a mobile communication system including the mobile communication terminal and a radio base station carrying out transmission using a plurality of antennas, said mobile communication terminal comprising:
   antenna weight instantaneous estimation means for estimating an instantaneous estimation value of an antenna weight from a signal received at a moment of estimation;
   antenna weight accumulative estimation means for estimating an accumulative estimation value of the antenna weight from accumulated received signals;
   received SNIR calculation means for calculating a received SNIR from the instantaneous estimation value obtained by said antenna weight instantaneous estimation means;
   transmission power control command generator for generating a transmission power control command from the received SNIR calculated by said received SNIR calculation means; and
   Rake combining means for carrying out Rake combining of the received signals in response to the accumulative estimation value obtained by said antenna weight accumulative estimation means.

2. The mobile communication terminal as claimed in claim 1, wherein said antenna weight instantaneous estimation means comprises:
   received signal amplitude estimation means for estimating average received signal amplitude after Rake combining;
   noise interference power calculation means for calculating noise interference power after Rake combining;
   antenna weight posterior probability calculation means for obtaining posterior probabilities of the antenna weight from the received signal amplitude estimation values obtained by said received signal amplitude estimation means, and from the noise interference power calculation values obtained by said noise interference power calculation means;
   antenna weight prior probability calculation means for obtaining prior probabilities of the antenna weight in response to an antenna weight control command transmitted from said mobile communication terminal; and
   antenna weight estimation means for estimating the antenna weight from the posterior probabilities obtained by said antenna weight posterior probability calculation means and from the prior probabilities obtained by said antenna weight prior probability calculation means.

3. The mobile communication terminal as claimed in claim 2, wherein said antenna weight accumulative estimation means comprises:
   received signal amplitude estimation means for estimating average received signal amplitude after Rake combining;
   noise interference power calculation means for calculating noise interference power after Rake combining;
   antenna weight posterior probability calculation means for obtaining posterior probabilities of the antenna weight from the received signal amplitude estimation values obtained by said received signal amplitude estimation means, and from the noise interference power calculation values obtained by said noise interference power calculation means;
   antenna weight prior probability calculation means for obtaining prior probabilities of the antenna weight in response to an antenna weight control command transmitted from said mobile communication terminal; and antenna weight estimation means for estimating the antenna weight from the posterior probabilities obtained by said antenna weight posterior probability calculation means and from the prior probabilities obtained by said antenna weight prior probability calculation means.

4. The mobile communication terminal as claimed in claim 3, wherein said received signal amplitude estimation means includes I-component amplitude estimation means and Q-component amplitude estimation means, said I-component amplitude estimation means calculating amplitude of I-components of the received signals from channel estimation values including the antenna weight obtained from individual pilot channels received at individual fingers and channel estimation values obtained from a common pilot channel, and said Q-component amplitude estimation means calculating amplitude of Q-components of the received signals from channel estimation values including the antenna weight obtained from individual pilot channels received at individual fingers and channel estimation values obtained from a common pilot channel;

said noise interference power calculation means includes means for ,calculating noise interference power calculation values from calculation values of noise interference power included in the fingers; and said antenna weight posterior probability calculation means includes antenna weight I-component posterior probability calculation means and antenna weight Q-component posterior probability calculation means, said antenna weight I-component posterior probability calculation means calculating the posterior probabilities of the antenna weight I-components from the I-component amplitude estimation values obtained by said I-component amplitude estimation means and the noise interference power calculation values obtained by said noise interference power calculation means, and said antenna weight Q-component posterior probability calculation means calculating the posterior probabilities of the antenna weight Q-components from the Q-component amplitude estimation values obtained by said Q-component amplitude estimation means and the noise interference power calculation values obtained by said noise interference power calculation means.

5. The mobile communication terminal as claimed in claim 2, wherein said received signal amplitude estimation means includes I-component amplitude estimation means and Q-component amplitude estimation means, said I-component amplitude estimation means calculating amplitude of I-components of the received signals from channel estimation values including the antenna weight obtained from individual pilot channels received at individual fingers and channel estimation values obtained from a common pilot channel, and said Q-component amplitude estimation means calculating amplitude of Q-components of the received signals from channel estimation values including the antenna weight obtained from individual pilot channels received at individual fingers and channel estimation values obtained from a common pilot channel;

said noise interference power calculation means includes means for calculating noise interference power calculation values from calculation values of noise interference power included in the fingers; and said antenna weight posterior probability calculation means includes antenna weight I-component posterior probability calculation means and antenna weight Q-component posterior probability calculation means, said antenna weight I-component posterior probability calculation means calculating the posterior probabilities of the antenna weight I-components from the I-component amplitude estimation values obtained by said I-component amplitude estimation means and the noise interference power calculation values obtained by said noise interference power calculation means, and said antenna weight Q-component posterior probability calculation means calculating the posterior probabilities of the antenna weight Q-components from the Q-component amplitude estimation values obtained by said Q-component amplitude estimation means and the noise interference power calculation values obtained by said noise interference power calculation means.

6. The mobile communication terminal as claimed in claim 1, wherein said antenna weight accumulative estimation means comprises:

received signal amplitude estimation means for estimating average received signal amplitude after Rake combining;

noise interference power calculation means for calculating noise interference power after Rake combining;

antenna weight posterior probability calculation means for obtaining posterior probabilities of the antenna weight from the received signal amplitude estimation values obtained by said received signal amplitude estimation means, and from the noise interference power calculation values obtained by said noise interference power calculation means;

antenna weight prior probability calculation means for obtaining prior probabilities of the antenna weight in response to an antenna weight control command transmitted from said mobile communication terminal; and antenna weight estimation means for estimating the antenna weight from the posterior probabilities obtained by said antenna weight posterior probability calculation means and from the prior probabilities obtained by said antenna weight prior probability calculation means.

7. The mobile communication terminal as claimed in claim 6, wherein said received signal amplitude estimation means includes I-component amplitude estimation means and Q-component amplitude estimation means, said I-component amplitude estimation means calculating amplitude of I-components of the received signals from channel estimation values including the antenna weight obtained from individual pilot channels received at individual fingers and channel estimation values obtained from a common pilot channel, and said Q-component amplitude estimation means calculating amplitude of Q-components of the received signals from channel estimation values including the antenna weight obtained from individual pilot channels received at individual fingers and channel estimation values obtained from a common pilot channel;

said noise interference power calculation means includes means for calculating noise interference power calculation values from calculation values of noise interference power included in the fingers; and said antenna weight posterior probability calculation means includes antenna weight I-component posterior probability calculation means and antenna weight Q-component posterior probability calculation means, said antenna weight I-component posterior probability calculation means calculating the posterior probabilities of the antenna weight I-components from the I-component amplitude estimation values obtained by said I-component amplitude estimation means and the noise interference power calculation values obtained by said noise interference power calculation means, and said antenna weight Q-component posterior probability calculation means calculating the posterior probabilities of the antenna weight Q-components from the Q-component amplitude estimation values obtained by said Q-component amplitude estimation means and the noise interference power calculation values obtained by said noise interference power calculation means.

8. A mobile communication terminal in a mobile communication system including the mobile communication terminal and a radio base station carrying out transmission using a plurality of antennas, said mobile communication terminal comprising:

received signal amplitude estimation means for estimating average received signal amplitude after Rake combining;

noise interference power calculation means for calculating noise interference power after Rake combining;

antenna weight posterior probability calculation means for obtaining posterior probabilities of the antenna weight from the received signal amplitude estimation value obtained by said received signal amplitude estimation means, and from the noise interference power calculation value obtained by said noise interference power calculation means;

antenna weight prior probability calculation means for obtaining prior probabilities of the antenna weight in response to an antenna weight control command transmitted from said mobile communication terminal; and antenna weight estimation means for estimating the antenna weight from the posterior probabilities obtained by said antenna weight posterior probability calculation means and from the prior probabilities obtained by said antenna weight prior probability calculation means.

9. The mobile communication terminal as claimed in claim 8, wherein said received signal amplitude estimation means includes I-component amplitude estimation means and Q-component amplitude estimation means, said I-component amplitude estimation means calculating amplitude of I-components of the received signals from channel estimation values including the antenna weight obtained from individual pilot channels received at individual fingers and channel estimation values obtained from a common pilot channel, and said Q-component amplitude estimation means calculating amplitude of Q-components of the received signals from channel estimation values including the antenna weight obtained from individual pilot channels received at individual fingers and channel estimation values obtained from a common pilot channel;

said noise interference power calculation means includes means for calculating noise interference power calculation values from calculation values of noise interference power included in the fingers; and said antenna weight posterior probability calculation means includes antenna weight I-component posterior probability calculation means and antenna weight Q-component posterior probability calculation means, said antenna weight I-component posterior probability calculation means calculating the posterior probabilities of the antenna weight I-components from the I-component amplitude estimation values obtained by said I-component amplitude estimation means and the noise interference power calculation values obtained by said noise interference power calculation means, and said antenna weight Q-component posterior probability calculation means calculating the posterior probabilities of the antenna weight Q-components from the Q-component amplitude estimation values obtained by said Q-component amplitude estimation means and the noise interference power calculation values obtained by said noise interference power calculation means.

10. An antenna weight estimation method in a mobile communication system including a mobile communication terminal and a radio base station carrying out transmission using a plurality of antennas, said antenna weight estimation method comprising:

an antenna weight instantaneous estimation step of estimating an instantaneous estimation value of an antenna weight from a signal received at a moment of estimation;

an antenna weight accumulative estimation step of estimating an accumulative estimation value of the antenna weight from accumulated received signals;

a received SNIR calculation step of calculating a received SNIR from the instantaneous estimation value obtained by said antenna weight instantaneous estimation step;

a transmission power control command generating step of generating a transmission power control command from the received SNIR calculated by said received SNIR calculation step; and a Rake combining step of carrying out Rake combining of the received signals in response to the accumulative estimation value obtained by said antenna weight accumulative estimation step.

11. The antenna weight estimation method as claimed in claim 10, wherein said antenna weight instantaneous estimation step comprises:

a received signal amplitude estimation step of estimating average received signal amplitude after Rake combining;

a noise interference power calculation step of calculating noise interference power after Rake combining;

an antenna weight posterior probability calculation step of obtaining posterior probabilities of the antenna weight from the received signal amplitude estimation values obtained by said received signal amplitude estimation step, and from the noise interference power calculation values obtained by said noise interference power calculation step;

an antenna weight prior probability calculation step of obtaining prior probabilities of the antenna weight in response to an antenna weight control command transmitted from said mobile communication terminal; and an antenna weight estimation step of estimating the antenna weight from the posterior probabilities obtained by said antenna weight posterior probability calculation step and from the prior probabilities obtained by said antenna weight prior probability calculation step.

12. The antenna weight estimation method as claimed in claim 10, wherein said antenna weight accumulative estimation step comprises:

a received signal amplitude estimation step of estimating average received signal amplitude after Rake combining;

a noise interference power calculation step of calculating noise interference power after Rake combining;

an antenna weight posterior probability calculation step of obtaining posterior probabilities of the antenna weight from the received signal amplitude estimation values obtained by said received signal amplitude estimation step, and from the noise interference power calculation values obtained by said noise interference power calculation step;

an antenna weight prior probability calculation step of obtaining prior probabilities of the antenna weight in response to an antenna weight control command transmitted from said mobile communication terminal; and an antenna weight estimation step of estimating the antenna weight from the posterior probabilities obtained by said antenna weight posterior probability calculation step and from the prior probabilities obtained by said antenna weight prior probability calculation step.

13. The antenna weight estimation method as claimed in claim 12, wherein said received signal amplitude estimation step includes an I-component amplitude estimation step and a Q-component amplitude estimation step, said I-component amplitude estimation step calculating amplitude of I-components of the received signals from channel estimation values including the antenna weight obtained from individual pilot channels received at individual fingers and channel estimation values obtained from a common pilot channel, and said Q-component amplitude estimation step calculating amplitude of Q-components of the received signals from channel estimation values including the antenna weight obtained from individual pilot channels received at individual fingers and channel estimation values obtained from a common pilot channel;

said noise interference power calculation step includes a step of calculating noise interference power calculation values from calculation values of noise interference power included in the fingers; and said antenna weight posterior probability calculation step includes an antenna weight I-component posterior probability calculation step and an antenna weight Q-component posterior probability calculation step, said antenna weight I-component posterior probability calculation step calculating the posterior probabilities of the antenna weight I-components from the I-component amplitude estimation values obtained by said I-component amplitude estimation step and the noise interference power calculation values obtained by said noise interference power calculation step, and said antenna weight Q-component posterior probability calculation step calculating the posterior probabilities of the antenna weight Q-components from the Q-component amplitude estimation values obtained by said Q-component amplitude estimation step and the noise interference power calculation values obtained by said noise interference power calculation step.

14. The antenna weight estimation method as claimed in claim 11, wherein said antenna weight accumulative estimation step comprises:

a received signal amplitude estimation step of estimating average received signal amplitude after Rake combining;

a noise interference power calculation step of calculating noise interference power after Rake combining;

an antenna weight posterior probability calculation step of obtaining posterior probabilities of the antenna weight from the received signal amplitude estimation values obtained by said received signal amplitude estimation step, and from the noise interference power calculation values obtained by said noise interference power calculation step;

an antenna weight prior probability calculation step of obtaining prior probabilities of the antenna weight in response to an antenna weight control command transmitted from said mobile communication terminal; and an antenna weight estimation step of estimating the antenna weight from the posterior probabilities obtained by said antenna weight posterior probability calculation step and from the prior probabilities obtained by said antenna weight prior probability calculation step.

15. The antenna weight estimation method as claimed in claim 14, wherein said received signal amplitude estimation step includes an I-component amplitude estimation step and a Q-component amplitude estimation step, said I-component amplitude estimation step calculating amplitude of I-components of the received signals from channel estimation values including the antenna weight obtained from individual pilot channels received at individual fingers and channel estimation values obtained from a common pilot channel, and said Q-component amplitude estimation step calculating amplitude of Q-components of the received signals from channel estimation values including the antenna weight obtained from individual pilot channels received at individual fingers and channel estimation values obtained from a common pilot channel;

said noise interference power calculation step includes a step of calculating noise interference power calculation values from calculation values of noise interference power included in the fingers; and said antenna weight posterior probability calculation step includes an antenna weight I-component posterior probability calculation step and an antenna weight Q-component posterior probability calculation step, said antenna weight I-component posterior probability calculation step calculating the posterior probabilities of the antenna weight I-components from the I-component amplitude estimation values obtained by said I-component amplitude estimation step and the noise interference power calculation values obtained by said noise interference power calculation step, and said antenna weight Q-component posterior probability calculation step calculating the posterior probabilities of the antenna weight Q-components from the Q-component amplitude estimation values obtained by said Q-component amplitude estimation step and the noise interference power calculation values obtained by said noise interference power calculation step.

16. The antenna weight estimation method as claimed in claim 11, wherein said received signal amplitude estimation step includes an I-component amplitude estimation step and a Q-component amplitude estimation step, said I-component amplitude estimation step calculating amplitude of I-components of the received signals from channel estimation values including the antenna weight obtained from individual pilot channels received at individual fingers and channel estimation values obtained from a common pilot channel, and said Q-component amplitude estimation step calculating amplitude of Q-components of the received signals from channel estimation values including the antenna weight obtained from individual pilot channels received at individual fingers and channel estimation values obtained from a common pilot channel;

said noise interference power calculation step includes a step of calculating noise interference power calculation values from calculation values of noise interference power included in the fingers; and said antenna weight posterior probability calculation step includes an antenna weight I-component posterior probability calculation step and an antenna weight Q-component posterior probability calculation step, said antenna weight I-component posterior probability calculation step calculating the posterior probabilities of the antenna weight I-components from the I-component amplitude estimation values obtained by said I-component amplitude estimation step and the noise interference power calculation values obtained by said noise interference power calculation step, and said antenna weight Q-component posterior probability calculation step calculating the posterior probabilities of the antenna weight Q-components from the Q-component amplitude estimation values obtained by said Q-component amplitude estimation step and the noise interference power calculation values obtained by said noise interference power calculation step.

17. An antenna weight estimation method in a mobile communication system including a mobile communication terminal and a radio base station carrying out transmission using a plurality of antennas, said antenna weight estimation method comprising:
   a received signal amplitude estimation step of estimating average received signal amplitude after Rake combining;
   a noise interference power calculation step of calculating noise interference power after Rake combining;
   an antenna weight posterior probability calculation step of obtaining posterior probabilities of the antenna weight from the received signal amplitude estimation value obtained by said received signal amplitude estimation step, and from the noise interference power calculation value obtained by said noise interference power calculation step;
   an antenna weight prior probability calculation step of obtaining prior probabilities of the antenna weight in response to an antenna weight control command transmitted from said mobile communication terminal; and
   an antenna weight estimation step of estimating the antenna weight from the posterior probabilities obtained by said antenna weight posterior probability calculation step and from the prior probabilities obtained by said antenna weight prior probability calculation step.

18. The antenna weight estimation method as claimed in claim 17, wherein said received signal amplitude estimation step includes an I-component amplitude estimation step and a Q-component amplitude estimation step, said I-component amplitude estimation step calculating amplitude of I-components of the received signals from channel estimation values including the antenna weight obtained from individual pilot channels received at individual fingers and channel estimation values obtained from a common pilot channel, and said Q-component amplitude estimation step calculating amplitude of Q-components of the received signals from channel estimation values including the antenna weight obtained from individual pilot channels received at individual fingers and channel estimation values obtained from a common pilot channel;
   said noise interference power calculation step includes a step of calculating noise interference power calculation values from calculation values of noise interference power included in the fingers; and
   said antenna weight posterior probability calculation step includes an antenna weight I-component posterior probability calculation step and an antenna weight Q-component posterior probability calculation step, said antenna weight I-component posterior probability calculation step calculating the posterior probabilities of the antenna weight I-components from the I-component amplitude estimation values obtained by said I-component amplitude estimation step and the noise interference power calculation values obtained by said noise interference power calculation step, and said antenna weight Q-component posterior probability calculation step calculating the posterior probabilities of the antenna weight Q-components from the Q-component amplitude estimation values obtained by said Q-component amplitude estimation step and the noise interference power calculation values obtained by said noise interference power calculation step.

* * * * *

UNITED STATES PATENT AND TRADEMARK OFFICE
CERTIFICATE OF CORRECTION

PATENT NO. : 6,853,839 B2
DATED : February 8, 2005
INVENTOR(S) : Masafumi Usuda and Takehiro Nakamura It is certified that error appears in the above-identified patent and that said Letters Patent is hereby corrected as shown below:

Title page,
Item [56], References Cited, OTHER PUBLICATIONS, "3rd Generation Partnership Project Technical Specification Group Radio Network;" reference, change "TS 2S" to -- TS 25 --

Column 1,
Line 5, change "claim" to -- claims --

Column 2,
Line 41, change " $\sigma_k^2$ " to -- $\tilde{\sigma}_k^2$ --

Line 42, change "$\gamma^2$" to -- $\tilde{\gamma}$ --

Column 10,
Line 57, change " $\sigma_k^2$ " to -- $\tilde{\sigma}_k^2$ --

Column 12,
Line 9, change "$X_0=0$" to -- $X_0 = \pi$ --

Line 27, change "w" to -- $\tilde{w}$ --

Signed and Sealed this

Second Day of August, 2005

JON W. DUDAS
*Director of the United States Patent and Trademark Office*